(12) United States Patent
Liu et al.

(10) Patent No.: US 8,840,501 B2
(45) Date of Patent: Sep. 23, 2014

(54) SINGLE INPUT AND SINGLE-OUTPUT HYBRID SYSTEM

(75) Inventors: Bradford P. Liu, Bloomfield Hills, MI (US); Feisel Weslati, Troy, MI (US)

(73) Assignee: Chrysler Group LLC, Auburn Hills, MI (US)

( * ) Notice: Subject to any disclaimer, the term of this patent is extended or adjusted under 35 U.S.C. 154(b) by 0 days.

(21) Appl. No.: 13/588,277

(22) Filed: Aug. 17, 2012

(65) Prior Publication Data

US 2014/0051536 A1 Feb. 20, 2014

(51) Int. Cl.
*F16H 3/72* (2006.01)

(52) U.S. Cl.
USPC .............................................. 475/5

(58) Field of Classification Search
USPC .............................. 475/5, 207, 219, 311, 314
See application file for complete search history.

(56) References Cited

U.S. PATENT DOCUMENTS

| | | | |
|---|---|---|---|
| 7,347,798 B2 * | 3/2008 | Raghavan et al. | 475/5 |
| 2006/0111213 A1 * | 5/2006 | Bucknor et al. | 475/5 |
| 2007/0219036 A1 * | 9/2007 | Bucknor et al. | 475/5 |
| 2010/0222171 A1 * | 9/2010 | Tabata et al. | 475/5 |

* cited by examiner

*Primary Examiner* — Robert A Siconolfi
*Assistant Examiner* — Huan Le
(74) *Attorney, Agent, or Firm* — Ralph E Smith

(57) ABSTRACT

A hybrid assembly having a single input and a single output is provided. The hybrid assembly may be operated in electronically variable, fixed gear, direct gear, and locked modes.

6 Claims, 3 Drawing Sheets

SINGLE INPUT AND SINGLE-OUTPUT HYBRID SYSTEM

FIELD

The present disclosure relates to a hybrid propulsion system for a vehicle, more particularly, to a compact and portable hybrid propulsion system having a single input and a single output.

BACKGROUND

Many modern automobiles utilize a hybrid transmission system in which an internal combustion engine, electric machine, or combination of the two provides propulsion for the vehicle. In a typical hybrid transmission system, torque from the engine and electric machines is supplied to a plurality of gears and clutches. Torque is output from this plurality of gears and shifting elements to drive the wheels of the vehicle. A typical hybrid transmission features either an electrically variable transmission mode ("EVT mode") or a fixed gear mode, but not both. In an EVT mode, torque must be supplied by both the engine and the electric machines and the overall transmission gear ratio between the transmission input and output can be constantly varied between a theoretically limitless number of gear ratios. In a fixed gear mode, power may be supplied by either or both of the engine and electric machines, but the overall transmission gear ratio between the transmission input and output can only be a limited number of fixed gear ratios. While some hybrid transmissions do feature both an EVT mode and fixed gear mode, these transmissions have augmented structures and generally need complicated torque and speed controls.

Typical hybrid transmissions serve as the only ratio-adjusting link between the engine and the wheels of the vehicle. This is largely a result of the intricate connections among the engine, electric machine, and hybrid transmission. These complicated connections make the addition of a typical hybrid transmission a complex process. Moreover, these complicated connections typically are not configured as single input and single output, and hence prevent the use of an additional gearbox such as a conventional automatic gearbox because of packaging and complexity concerns. This limits the overall gear ratio achievable by the hybrid drive system. Accordingly, the inventors herein recognized the need for improvement in the art.

SUMMARY

In one form, the present disclosure provides hybrid drive train including a hybrid assembly. The hybrid assembly includes a planetary gear set. The planetary gear set includes a sun gear, a carrier, a plurality of planet gears rotatably affixed to the carrier and continuously meshed with the sun gear, and a ring gear continuously meshed with the plurality of planet gears. The hybrid assembly also includes a first electric machine having a first electric machine rotor coupled to the sun gear, and a second electric machine having a second electric machine rotor coupled to the ring gear. The hybrid assembly further includes a brake clutch configured to selectively couple the first electric machine rotor to a housing of the hybrid assembly, and a first clutch configured to selectively lock the planetary gear set.

In another form, the present disclosure provides hybrid drive train including a hybrid assembly. The hybrid assembly includes a planetary gear set. The planetary gear set includes a sun gear, a carrier, a plurality of planet gears rotatably affixed to the carrier and continuously meshed with the sun gear, and a ring gear continuously meshed with the plurality of planet gears. The hybrid assembly also includes a first electric machine having a first electric machine rotor, wherein the first electric machine rotor is the sun gear. The hybrid assembly further includes a second electric machine having a second electric machine rotor, wherein the second electric machine rotor is the ring gear. The hybrid assembly also includes a brake clutch configured to selectively couple the first electric machine rotor to a housing of the hybrid assembly, and a first clutch configured to selectively coupled the ring gear to the carrier.

Thus, a hybrid drive system is provided that offers both an EVT mode and a fixed gear mode and retains full functionality of the engine and electric machines regardless of their operating state. The hybrid transmission can be added to existing automobiles with or without an additional transmission. The hybrid transmission has controls independent from those of the optional additional transmission.

Further areas of applicability of the present disclosure will become apparent from the detailed description provided hereinafter. It should be understood that the detailed description, including disclosed embodiments and drawings, are merely exemplary in nature intended for purposes of illustration only and are not intended to limit the scope of the invention, its application or use. Thus, variations that do not depart from the gist of the invention are intended to be within the scope of the invention.

DETAILED DESCRIPTION

Figure 1:
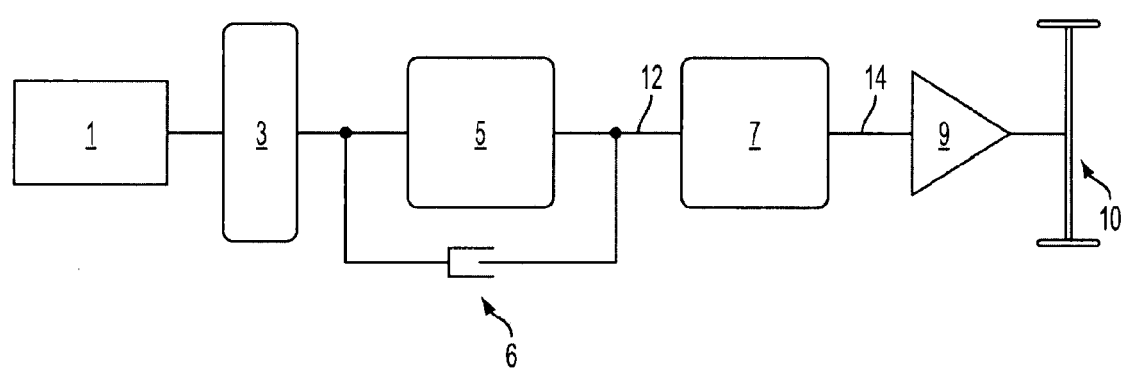
FIG. 1 is a schematic representation of an exemplary prior art drive train having an automatic gearbox.

FIG. 1 illustrates an example schematic representation of a prior art drive train having an automatic gearbox. The prior art drive train includes an engine 1 coupled to a torsional vibration damper 3. The engine 1 may be any type of power source including an internal combustion engine, turbine engine, or any other desired power source. The torsional vibration damper 3 is coupled to a torque converter 5. The torque converter 5 is coupled by a shaft 12 to an automatic gearbox 7. The automatic gearbox 7 is coupled by a shaft 14 to a final drive 9 that is coupled to a drive axle 10, where the automatic gearbox 7 is functionally utilized as part of controllable drive ratios. In one embodiment, the drive train includes a torque converter lockup clutch 6 that selectively couples the torsional vibration damper 3 to the shaft 12. The torsional vibration damper 3, torque converter 5, automatic gearbox 7, final drive 9, drive axle 10, and torque converter lockup clutch 6 are all typical components in a vehicle drive train as would be understood by one of skill in the art.

It is desirable to provide a hybrid drive system with both an EVT mode and a fixed gear mode that retains full functionality of the engine and electric machines regardless of their operating state. It is also desirable to provide a simple hybrid transmission that can be added to existing automobiles with or without an additional transmission. It is also desirable to provide a hybrid transmission having controls independent from those of an optional automatic gearbox.

Figure 2:
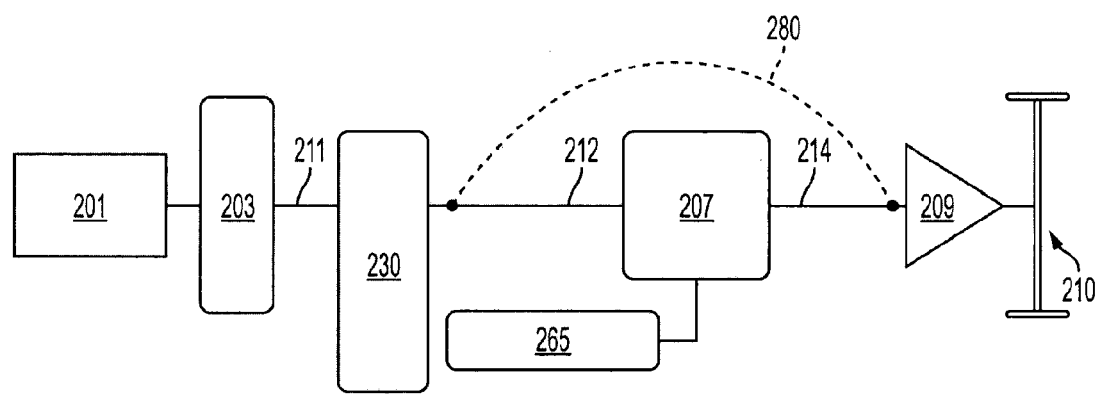
FIG. 2 is a schematic representation of the drive train of FIG. 1 having an exemplary single-input and single-output hybrid system.

FIG. 2 is an example schematic representation of the drive train of FIG. 1 having a single-input and single-output hybrid system according to an embodiment disclosed herein. The drive train includes an engine 201 coupled to a torsional vibration damper 203. The engine 201 may be any type of power source including an internal combustion engine, turbine engine, or any other desired power source. The torsional vibration damper 203 is coupled to a single-input and single-output hybrid assembly 230 ("hybrid assembly") by a shaft 211. The hybrid assembly 230 is coupled by a shaft 212 to an automatic gearbox 207. The automatic gearbox 207 is coupled by a shaft 214 to a final drive 209 that is coupled to a drive axle 210, where the hybrid assembly 230 functions as the hybrid core system, as a torque converter 5 replacement or a vehicle launch device. In one embodiment, the hybrid assembly 230 may be directly coupled to the final drive 209, and the automatic gearbox 207 may be omitted. In one embodiment, the drive train includes a bypass linkage 280 that selectively connects the hybrid assembly 230 to the final drive 209, bypassing the automatic gearbox 207. In one embodiment, the bypass linkage 280 selectively connects the hybrid assembly 230 to the drive axle 210, bypassing the automatic gearbox 207 and the final drive 209.

The drive train also includes an automatic gearbox auxiliary pump 265. The automatic gearbox auxiliary pump 265 utilizes electric motor(s) to drive a hydraulic or electric pump to provide the force necessary to operate the clutches within the automatic gearbox 207 when the engine 201 is not operating.

Figure 3:
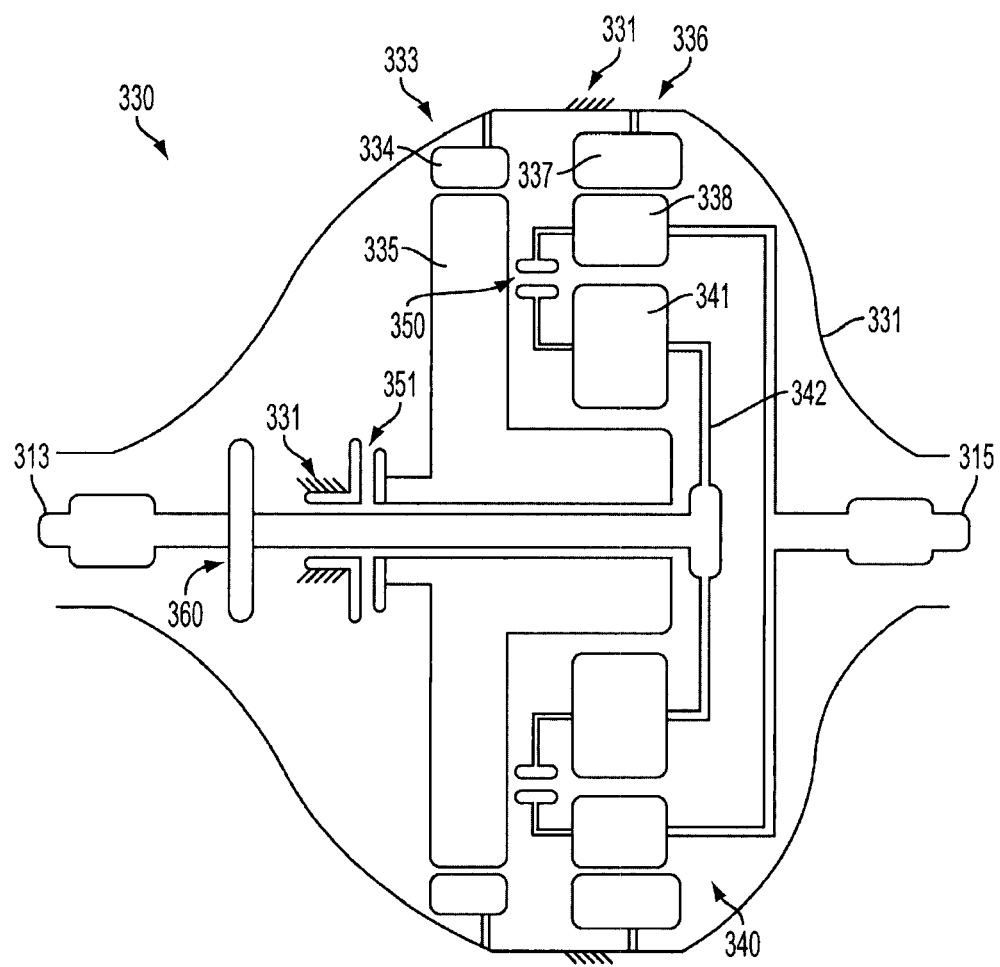
FIG. 3 is a schematic representation of the single-input and single-output hybrid system of FIG. 2.

FIG. 3 is an example schematic representation of the single-input and single-output hybrid system ("hybrid assembly") of FIG. 2 according to an embodiment disclosed herein. The hybrid assembly 330 includes a housing 331 that surrounds the components of the hybrid assembly 330. The hybrid assembly 330 also includes a hydraulic or electric pump 360 coupled to a hybrid assembly input shaft 313. The hybrid assembly input shaft 313 is coupled to shaft 211 of FIG. 2. The hydraulic or electric pump 360 supplies oil pressure to operate a first clutch 350 and a brake clutch 351 of the hybrid assembly. In one embodiment, the hydraulic or electric pump 360 may be omitted. The shaft 313 is also coupled to a carrier 342 of a planetary gear set 340. A plurality of planet gears 341 are rotatably mounted on the carrier 342. Each planet gear 341 is meshed with a first electric machine rotor 335 and a second electric machine rotor 338. The first electric machine rotor 335 acts as the rotor of a first electric machine 333 and the second electric machine rotor 338 acts as the rotor of a second electric machine 336. The first electric machine rotor 335 also acts as the sun gear of the planetary gear set 340. The second electric machine rotor 338 also acts as the ring gear of the planetary gear set 340. A first electric machine stator 334 of the first electric machine 333 is coupled to the housing 331. A second electric machine stator 337 of the second electric machine 336 is coupled to the housing 331.

The first electric machine rotor 335 is selectively coupled to the housing 331 by the brake clutch 351. The second electric machine rotor 338 is selectively coupled to the carrier 342 by the first clutch 350. The second electric machine rotor 338 is coupled to a hybrid assembly output shaft 315. The hybrid assembly output shaft 315 is coupled to shaft 212 of FIG. 2.

The hybrid assembly 330 may be operated in four different modes. In a first mode, the hybrid assembly 330 may be operated as an electrically variable transmission ("EVT mode") such that the ratio between the RPM of the hybrid assembly input shaft 313 and hybrid assembly output shaft 315 is continuously variable by adjusting the torque supplied by the first electric machine 333, second electric machine 336, and engine 201. To operate in the EVT mode, the first clutch 350 and the brake clutch 351 are deactivated. Thus, the carrier 342 is free to rotate independently of the second electric machine rotor 338, and the first electric machine rotor 335 is free to rotate independently of the housing 331. As a result, there are two degrees of freedom within the hybrid assembly 330. Torque to the hybrid assembly output shaft 315 may be provided by the engine 201 in combination with the first electric machine 333 and the second electric machine 336. Further, both first electric machine 333 and second electric machine 336 may be used to generate electricity during vehicle braking or as otherwise desired.

In a second mode, the hybrid assembly 330 may operate in a fixed gear ratio ("fixed gear mode") in which the ratio between the RPM of the hybrid assembly input shaft 313 and hybrid assembly output shaft 315 is constant regardless of the amount of torque supplied by the second electric machine 336 and engine 201. To operate in the fixed gear mode, the first clutch 350 is deactivated and the brake clutch 351 is activated. Thus, the carrier 342 is free to rotate independently of the second electric machine rotor 338, but the first electric machine rotor 335 is locked to the housing 331 and does not rotate. Because the first electric machine rotor 335 is locked, rotation of the planet gears 341 will cause the second electric machine rotor 338 to rotate. As a result, there is only one degree of freedom within the hybrid assembly 330. Torque to the hybrid assembly output shaft 315 may be provided by the engine 201. The second electric machine 336 may be used as an electric generator to generate electricity or as an electric motor to provide additional torque as desired.

In a third mode, the hybrid assembly 330 may operate in a direct gear ratio ("direct gear mode") in which the hybrid assembly input shaft 313 and hybrid assembly output shaft 315 rotate at the same RPM regardless of the amount of torque supplied by the first electric machine 333, second electric machine 336, and engine 201. To operate in the direct gear mode, the first clutch 350 is activated and the brake clutch 351 is deactivated. Thus, the carrier 342 rotates at the same RPM as the second electric machine rotor 338, and the first electric machine rotor 335 is free to rotate independently of the housing 331. In effect, the planetary gear set 340 is locked. As a result, there is only one degree of freedom within the hybrid assembly 330. Torque to the hybrid assembly output shaft 315 may be provided by the engine 201 in combination with the first electric machine 333 and the second electric machine 336. Alternatively, when additional torque is demanded, the engine 201, first electric machine 333, and second electric machine 336 may all provide torque.

In a fourth mode, the hybrid assembly 330 may be locked ("locked mode") to prevent any rotation of the hybrid assembly input shaft 313 and hybrid assembly output shaft 315. To operate in the locked mode, the first clutch 350 and the brake clutch 351 are activated. Thus, the carrier 342 rotates at the same RPM as the first electric machine rotor 335, and the first electric machine rotor 335 is locked to the housing 331. As a result, there are zero degrees of freedom within the hybrid assembly 330. In one embodiment, the locked mode may be used as a mechanical parking brake.

In one embodiment, the automatic gearbox 207 may be a manual transmission or any other type of desired transmission or power transfer device. In one embodiment, the first electric machine rotor 335 and the second electric machine rotor 338 have the same diameter. In another embodiment, the first electric machine rotor 335 has a smaller diameter than the second electric machine rotor 338. In another embodiment, the first electric machine rotor 335 has a larger diameter than the second electric machine rotor 338. In one embodiment, the automatic gearbox 207 may be omitted altogether and any necessary ratio shifting may be provided by the hybrid assembly 330. In one embodiment, the bypass linkage 280 may be used to selectively bypass the automatic gearbox 207 and couple the hybrid assembly 330 directly to the final drive 209. Thus, in one embodiment, the hybrid assembly 330 may be the sole ratio shifting device between the engine 201 and the wheels of a vehicle.

In one embodiment, the first clutch 350 may selectively couple the second electric machine rotor 338 to the first electric machine rotor 335, instead of to the carrier 342. In one embodiment, the first clutch 350 may selectively couple the carrier 342 to the first electric machine rotor 335, instead of to the second electric machine rotor 338. The modes of operation and corresponding clutch states of the hybrid assembly 330 in these two embodiments would be identical to those described above where the first clutch 350 selectively couples the second electric machine rotor 338 to the carrier 342. In one embodiment, the control of the hybrid assembly 330 and its first clutch 350 and brake clutch 351 may be achieved by an electronic control unit. In one embodiment, the electric control unit may be the same as or different from the electronic control unit used to control the automatic gearbox 207, when present.

In one embodiment, one of the first clutch 350 or brake clutch 351 may be omitted. In such an embodiment, the operating modes of the hybrid assembly 330 would be limited to the above described modes in which the omitted first clutch 350 or brake clutch 351 is deactivated. For instance, if the first clutch 350 is omitted, the hybrid assembly 330 would be limited to operation in the EVT mode and fixed gear mode. Likewise, if the brake clutch 351 is omitted, the hybrid assembly 330 would be limited to operation in the EVT mode and direct gear mode.

Thus, a hybrid drive system offering both an EVT mode and a fixed gear mode and having a compact configuration is described. The hybrid drive system retains full functionality of the engine and electric machines regardless of their operating state. The hybrid drive system can be added to existing automobiles with or without an additional transmission. The hybrid transmission may have controls independent from those of the automatic gearbox.

What is claimed is:

1. A hybrid drive train, comprising:
   a hybrid assembly, comprising:
      a planetary gear set, comprising:
         a sun gear,
         a carrier,
         a plurality of planet gears rotatably affixed to said carrier and continuously meshed with said sun gear,
         a ring gear continuously meshed with said plurality of planet gears;
      a hybrid assembly input shaft coupled to said carrier;
      a hybrid assembly output shaft coupled to said ring gear;
      a first electric machine having the sun gear arranged to operate as a first electric machine rotor;
      a second electric machine having the ring gear arranged to operate as a second electric machine rotor;
      a brake clutch configured to selectively couple said first electric machine rotor to a housing of said hybrid assembly; and
      a first clutch configured to selectively couple said ring gear to said carrier,
   wherein said hybrid assembly is constructed to operate:
      in a first electrically variable transmission mode where both said first clutch and said brake clutch are deactivated,
      in a second fixed gear ratio mode where said first clutch is deactivated and said brake clutch is activated,
      in a third direct gear ratio mode where said first clutch is activated and said brake clutch is deactivated, and
      in a fourth locked mode where both said first clutch and said brake clutch are activated.

2. The hybrid drive train of claim 1, wherein said first electric machine rotor is said sun gear and said second electric machine rotor is said ring gear.

3. The hybrid drive train of claim 1, wherein said first electric machine rotor is equal in diameter to said second electric machine rotor.

4. The hybrid drive train of claim 1, wherein said first electric machine rotor is larger in diameter than said second electric machine rotor.

5. The hybrid drive train of claim 1, further comprising:
   an engine coupled to said hybrid assembly input shaft; and
   an automatic gearbox coupled to said hybrid assembly output shaft.

6. The hybrid drive train of claim 5, wherein said automatic gearbox is coupled to a final drive and further comprising a bypass linkage selectively coupling said hybrid assembly output shaft directly to said final drive and selectively bypassing said automatic gearbox.

* * * * *